United States Patent [19]

Makino

[11] Patent Number: 5,211,508
[45] Date of Patent: May 18, 1993

[54] TOTAL WATER CIRCULATION SYSTEM FOR SHALLOW WATER AREAS

[75] Inventor: Hisao Makino, Ichikawa, Japan

[73] Assignee: Kaiyo Kogyo Kabushiki Kaisha, Tokyo, Japan

[21] Appl. No.: 839,404

[22] Filed: Feb. 20, 1992

[51] Int. Cl.$^5$ .................... E02B 3/00; E02B 15/00
[52] U.S. Cl. ........................................ 405/52; 405/22; 405/62
[58] Field of Search .............. 405/22, 52, 61, 62, 405/73, 74

[56] References Cited

U.S. PATENT DOCUMENTS

| | | | |
|---|---|---|---|
| 2,442,358 | 6/1948 | Harp | 405/74 |
| 2,748,075 | 5/1956 | Hovlid | 405/22 X |
| 3,148,509 | 9/1964 | Laurie | 405/22 |
| 3,686,887 | 8/1972 | Bruce | 405/74 X |
| 4,300,855 | 11/1981 | Watson | 405/61 |

*Primary Examiner*—David H. Corbin
*Attorney, Agent, or Firm*—Wenderoth, Lind & Ponack

[57] ABSTRACT

A method and an apparatus are used in shallow water areas having a depth of about two meters or less for producing a total water circulating flow from the bottom toward the top and then from the top toward the bottom, to thereby improve the quality of the total water. The method consists essentially of providing an upward jet of fluid under pressure acting upon a water flow rising from the bottom toward the top through a tubular passage of vertically disposed tubular construction so that the water flow can rise with an increased speed. At the top end of the tubular passage, the water flow is jetted out, forcing a circulating flow with circular motions. The apparatus comprises a vertically disposed tubular construction having a tubular passage through which the water flows and rises, including a member for producing an upward jet of fluid under pressure disposed inside the tubular passage and exposed to the water in the tubular passage.

13 Claims, 3 Drawing Sheets

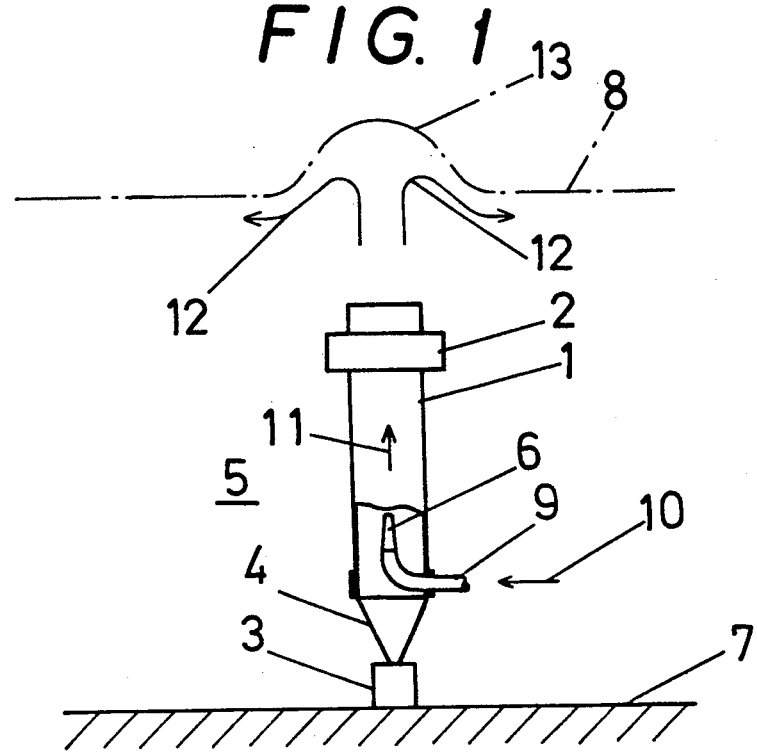
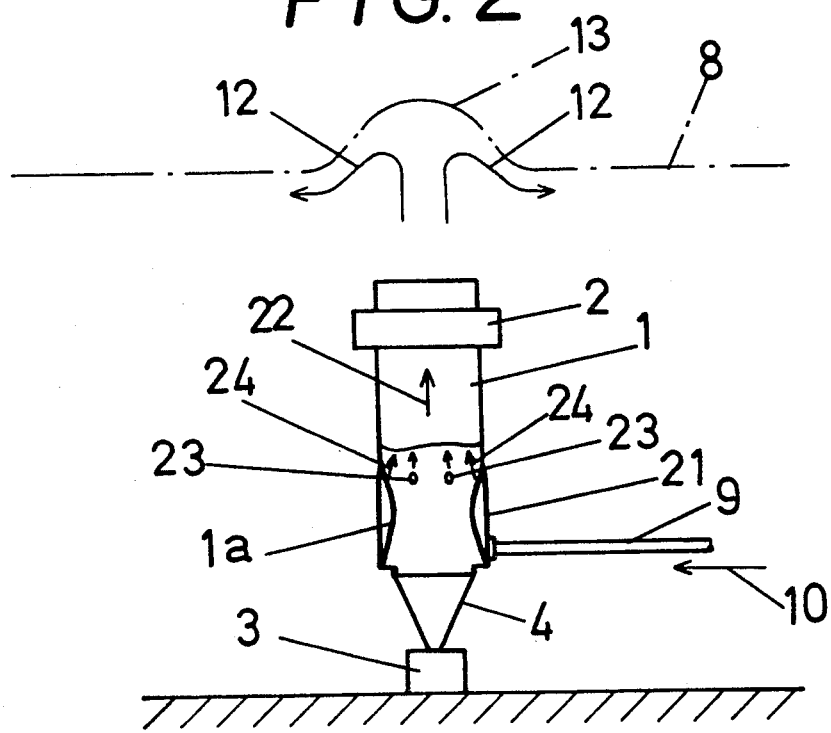

TOTAL WATER CIRCULATION SYSTEM FOR SHALLOW WATER AREAS

BACKGROUND OF THE INVENTION

1. Field of the Invention

The present invention relates to a system for improving the quality of water in the shallow water areas. More particularly, it relates to a method of and an apparatus for producing a circulatory water flow from the top toward the bottom and then from the bottom toward the top, to thereby increase the amount of oxygen that can be contained in the total water.

2. Description of the Prior Art

A conventional system has been used in those shallow water areas which are about two meters or less deep, and produces a circulatory flow of water over the water area from the top toward the bottom and then from the bottom toward the top. Specifically, the system includes a method and an apparatus described in the unexamined Japanese patent publication Nos. Showa 63-240989 and Heisei 2-50000.

In the conventional method and apparatus as mentioned above, a tubular construction which may be vertically installed in any shallow water area includes means for producing air bubbles at specific regular intervals. The air bubbles form an individual air bubble mass which rises through the tubular passage of the tubular construction due to its respective buoyant action while contacts with the whole inner wall of the tubular passage at the specific regular intervals. Under the buoyant action, the water above and below those respective air bubble masses can be drawn upwardly by the air bubble masses and will rise until finally the water is jetted out onto the surface from the top end of the tubular construction. Those jets of water ejected from the tubular construction diffuse radially over the water area. In this way, those portions of water which would normally stay near the bottom can be raised, and can produce a circulatory flow from the bottom toward the surface and then from the surface toward the bottom. Prior to the present invention, it has been known in the art that the technology as disclosed in the above respective publications provides the only effective means for improving the quality of water in shallow water areas in particular.

The method and apparatus described above are essentially provided for producing air bubbles at the particular regular intervals, and must therefore take into account physical dimensional requirements such as the relationships between the particular length and diameter of the tubular passages of the tubular construction for better performance when water is raised. In the shallow water areas (such as two meters or less deep), the length of the tubular construction is limited accordingly, and so the effective performance can only be achieved when a diameter of 20 cm or smaller is selected in relation to the length. In this case, it is difficult to raise a large amount of water at a time.

To avoid the above limitations, the conventional apparatus and method provide a solution whereby several smaller-diameter tubes, each of a given length, are bundled together to provide a greater diameter in total, or provide an alternative solution whereby any particular location where the installation is to be settled on the bottom is made deeper to allow for a longer passage and for the corresponding greater diameter passage. In either of these ways, more water can be raised. However, it should be noted that relying upon the buoyant action of the air bubbles restricts the flow rate of water being drawn by and raised with the produced air bubble masses. For example, the flow rate of the water that can be raised through the tubular passage is actually limited to 1.5 m/sec. As described, the amount of water to be raised at a time is limited by the small diameter of the tubular passage. This limitation may be removed by increasing the flow rate at which the water that can be raised. However, this is impossible according to the conventional method and apparatus, because the flow rate cannot be further increased. The amount of water to be raised can only be increased by increasing the number of tubular passages that are bundled together and installed in the shallow water areas.

SUMMARY OF THE INVENTION

In order to solve the problems described above, it is a principal object of the present invention to provide a tubular construction that is specifically designed to be installed vertically in a shallow water area, including means for forcing water to flow through the tubular construction to rise from the bottom toward the top with an increasing flow rate. Thus, a forced water flow can be produced such that required amount of water can be raised through the tubular passage, regardless of the depth of the installation.

Similarly, the present invention also provides a method that may be used with a tubular construction that is specifically designed to be installed vertically in the shallow water area. The method includes a step of producing a forced water flow through the tubular construction rising from the bottom toward the top, to thereby act upon the water in the tubular passage force it to flow and rise with an increased flow rate, so that the required amount of water can rise through the tubular passage, regardless of the depth of the installation.

The means for producing the forced flow of water may include a nozzle that provides an upward jet of fluid under pressure.

Specifically, the apparatus of the present invention includes a tubular construction having a tubular passage that may be installed upright in any shallow water area for allowing water to flow upwardly from the bottom toward the top, and a nozzle for supplying an upward jet of fluid under pressure. The nozzle is provided inside of the tubular passage and is exposed to the water in the tubular passage. The nozzle may extend through the lower peripheral wall of the tubular passage so that it is exposed to the water in the tubular passage at the center of the tubular passage, or may be provided around the lower peripheral wall portion so that it is exposed to the water in the tubular passage through several apertures provided around the lower peripheral wall of the tubular passage. In either case, the nozzle is directed upwardly.

The pump for supplying fluid under pressure for the nozzle through a connecting hose may be placed on land or under water.

According to the present invention, the fluid under pressure is used as the means for producing the forced water flow so that the need of using any mechanical means (such as propellers) can be eliminated. Thus, the upward water flow can be obtained at the flow rate as required.

It may be appreciated that the present invention can eliminate all of the limitations on the physical dimensions of the apparatus such as the length and diameter of the tubular passage. Therefore, the amount of water that can be raised or the efficiency with which the water can be raised is increased, when the conventional tubular construction is installed in the shallow water area. Thus, the tubular construction of the present invention can be installed in any shallow water area (such as an area having a depth of about two meters or less) and be equally effective with respect to the amount of water that can be raised as well as the flow rate with which the water can be raised. Theoretically, the flow rate at which the water rises through the tubular passage may depend upon the amount of energy that is supplied and the flow rate may be increased with an increased applied energy. For practical purposes, however, any flow rate between 1 m/sec. and 3 m/sec is economical. This flow rate results in easy future maintenance. With the increased flow rate, the water flow through the tubular passage can be jetted out from the top end of tubular passage and spouted up the higher above the surface. In this way, the water can be aerated effectively so that it can contain more ogygen. In this respect, the flow rate should preferably be in the range as described above, and the top end of the tubular construction should preferably be located about 30 cm below the surface.

The water flow that is jetted out from the top end of the tubular construction pushes the water up as shown in FIG. 1, and then the water falls, flows laterally and diffuses radially, as shown in FIGS. 4 and 5.

The nozzle may be located anywhere along the tubular passage, but should preferably be located on or near the bottom end of the tubular passage as shown so that the required flow rate can be achieved.

According to the present invention, the tubular construction may be installed with a vertical orientation in the shallow water area, and the water that stays on or near the bottom may be forced to rise through the tubular passage by and with the forced water flow. The water will increase in its flow rate as it flows upwardly toward the top end of the passage, from which it is jetted out onto the surface and diffuses radially over the surface. The whole water area surrounding the tubular construction can have a circulatory flow from the top toward the bottom and then from the bottom toward the top. This circulatory flow causes the water near the surface to go down to the bottom and meet with the water on the bottom. Thus, the two water portions are mixed together. As the surface water contains a large amount of oxygen and the bottom water portion contains little oxygen, this mixture may refresh the bottom water portion so that it will contain more oxygen. During the above process, the entire portion of water under the influence of the circulatory flow will be uniformly provided with oxygen. The above process can be completed in a short time. Some substances (such as polymer aggregators, alkalis, disinfectants, and the like) may be added during the process. In this case, those substances can mix with the water, and the resulting mixture can rise as described above. Thus, the substances contained in the water can diffuse together with the water, and can be distributed evenly in the total water.

It may be appreciated that the present invention may improve the water quality such by increasing the oxygen content, may change the water from acid to alkaline, and may diffuse and distribute added substances such as polymer aggregators. These tasks can be achieved with high efficiency.

BRIEF DESCRIPTION OF THE DRAWINGS

These and other objects, features, and advantages of the present invention may be understood from the detailed description of several preferred embodiments that follows by referring to the accompanying drawings, in which:

FIG. 1 is a schematic front elevation view of an installation, partly broken away, according to a first preferred embodiment of the present invention;

FIG. 2 is similar to FIG. 1 but shows a second preferred embodiment of the present invention;

DESCRIPTION OF THE PREFERRED EMBODIMENTS

Figure 3:
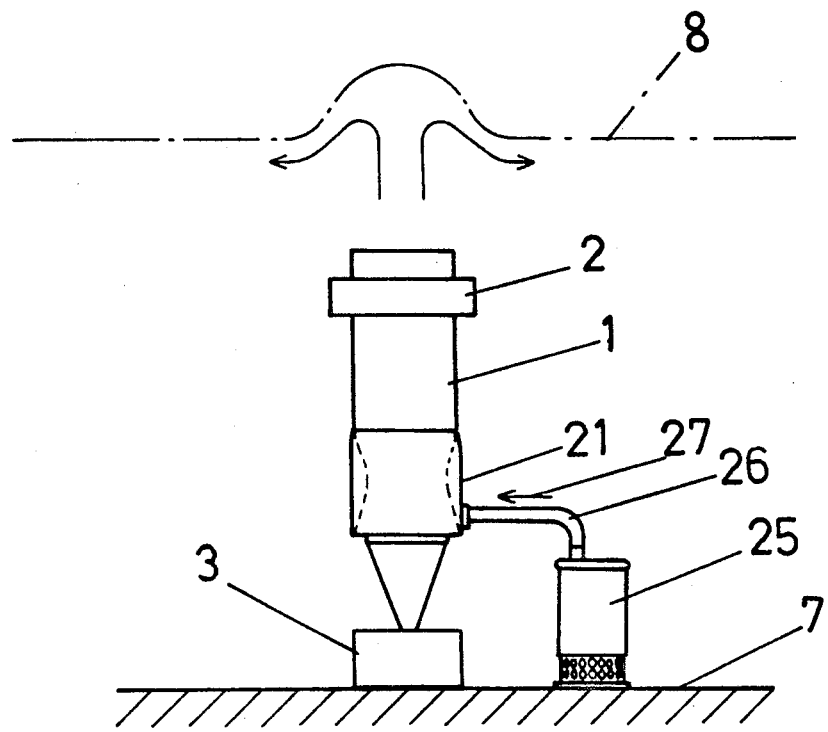
FIG. 3 is similar to the preceding figures but shows a third preferred embodiment of the present invention.

In the following description, several preferred embodiments are shown and discussed by referring to the respective drawings.

First Embodiment

Referring to FIG. 1, there is shown the first embodiment of the present invention which will now be described.

An apparatus 5 comprises a tubular construction, generally designated by reference numeral 1, which may be installed in its vertical or upright position in the water. The tubular construction 1 includes an air chamber 2 which acts as a float at the top, a weight 3 which depends from the bottom end by means of a rope 4 and is disposed and secured in position on the bottom, and a nozzle 6 which extends into the tubular construction on the lower side thereof and provides a jet of fluid under pressure. In FIG. 1, reference numeral 7 designates the bottom of the water area, and 8 designates the water surface.

Figure 4:
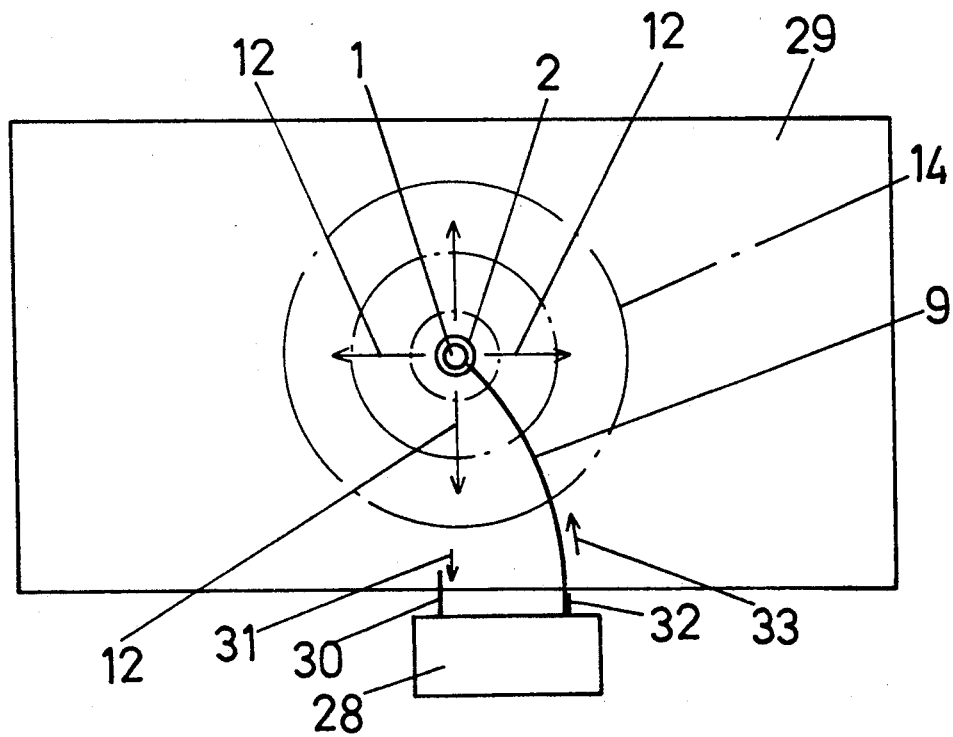
FIG. 4 is a plan view of the installation shown in FIG. 1.
Figure 5:
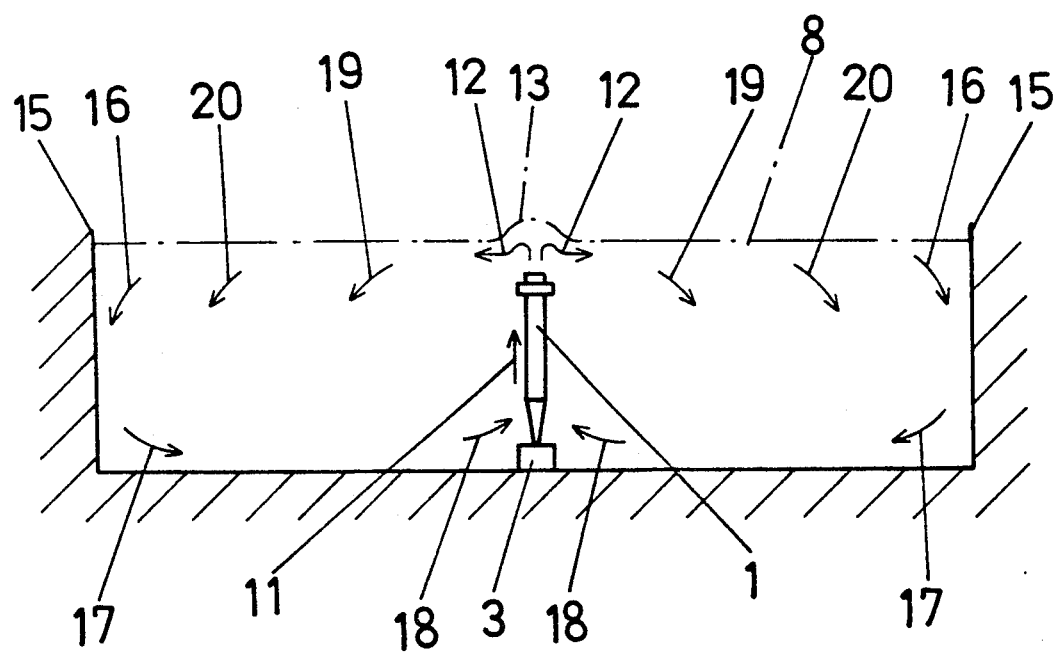
FIG. 5 is a sectional view of the installation shown in FIG. 1.

In operation, a fluid is delivered under pressure (such as at 1.5 kgs./cm$^2$) from a source (not shown) to the nozzle 6 by way of a hose 9, as shown by an arrow 10. The nozzle 6 then supplies a jet of fluid under pressure as shown by an arrow 11. The jet of fluid from the nozzle 6 acts upon the water in the internal passage through the tubular construction 1, forcing the water which enters the tubular construction 1 to rise from its bottom end and to be finally jetted out from its top end. The water may rise at the rate of two meters per second (2 m/sec.), for example, until it finally reaches the top end of the passage. As the water flow is jetted out of the passage, it can raise the surface water above it as shown at 13. Part of the surface water may splash high into the air and become aerated. Following the aeration, the water will diffuse in radial directions as shown by arrows 12, 12 (FIG. 4). As the water diffuses radially, it may undergo circular motions 14 around the tubular construction 1 (FIG. 4) which propagate in a concentric fashion near the surface, and approach the shore 15 where the water flows back and falls deep toward the bottom. This water flow goes back to the bottom end of the tubular construction 1 as shown by arrows 16, 17 and 18 (FIG. 5). During the circular motions, some of the water may go deep toward the bottom as shown by arrows 19 and 20. The operation as described above may be continued until a uniform distribution of oxygen contained in the total water can be reached. For example, when a single installation that includes a 20-cm diameter tubular construction and has a capacity of 0.1 m³/sec. of fluid under pressure is used in a water area that is two meters deep and contains 5,000 m³ to 10,000 m³ of water, the operation may continue for one or two days so that a uniform distribution of oxygen in the total water can be reached.

For a typical farm where eels are raised, for example, the content of oxygen will increase up to its saturation point during the daytime because the waterweeds are active, and will decrease to below 4 to 6 ppm. during the nighttime because the existing oxygen is only consumed. When the present invention is used in such area, the content of oxygen can be maintained to at least 8 ppm during the nighttime when the least oxygen content would otherwise exist.

In the above embodiment, the delivery of the fluid under pressure may be accomplished by using a pump 28 which has the required capacity and may be installed on land, as shown in FIG. 4. In the example shown in FIG. 4, when the pump 28 is started up, it may draw water from a pond 29 through an inlet pipe 30 as shown by an arrow 31, and may deliver the water through an outlet pipe 32 as shown by an arrow 33 and then through the connecting hose 9 to the nozzle 6.

Second Embodiment

Referring next to FIG. 2, the second preferred embodiment will be described.

In this embodiment, the apparatus comprises a tubular construction 1 and a chamber 21 that surrounds the lower outer peripheral portion of the tubular construction 1 for providing water under pressure, with a hose 9 extending from the chamber 21. The tubular construction 1 includes a constricted portion 1a located where the chamber 21 is located. The constricted portion 1a has nozzle apertures 23, 23 formed at intervals around the upper peripheral portion thereof. The remainder of the apparatus is similar to the embodiment shown in FIG. 1.

In operation, water may be delivered under pressure through the hose 9 into the chamber 21 as shown by an arrow 10, from which the water flows as jet of water into the tubular construction 1 through the nozzle apertures 23, 23, as shown by an arrow 24.

The jets of water from the nozzle apertures 23 can act upon the water as it rises through the tubular passage 1 from its bottom end so that the rising speed of the water flow will increase as shown by an arrow 22 and jet out from the top end of tubular passage 1. This water flow raises the water above the tubular passage 1 as shown by the dot-dash lines 13, when it is jetted out of the tubular passage 1, and it is then diffused in the radial directions as shown by an arrow 12. Then, the circulatory flow can occur from the top toward the bottom and then from the bottom toward the top as shown in FIG. 5.

Third Embodiment

Referring to FIG. 3, there is shown the third preferred embodiment which differs from the second embodiment shown in FIG. 2 in the manner in which the delivery pumps provide water under pressure. In the preceding embodiment, the delivery pump 28 is placed on the land, and the hose 9 is used for delivering water under pressure. In the current embodiment, a delivery pump 25 is placed under the water. The remainder of the apparatus is similar to the embodiment shown in FIG. 2. Specifically, the outlet pipe 26 from the pump 25 is coupled with the chamber 21 located around the lower outer peripheral portion of the tubular construction 1. When the pump 25 is started up, the water under pressure is delivered through the outlet pipe 26 into the chamber 21 as shown by an arrow 27, and then enters the tubular passage through the nozzle apertures 23, 23 as jets of water, as described for the second embodiment. Those jets of water act upon the water flow that rises through the tubular passage so that the water can rise with an increased speed. At the top end of the tubular passage, the water flow is jetted out, and diffuses radially and produces circular motions. The subsequent behavior of the water flow has been described in connection with the preceding embodiment, and so the details are omitted for simplicity.

Although the present invention has been described in full detail with reference to the several preferred embodiments, it should be understood that various changes and modifications may be made without departing from the spirit and scope of the invention as defined in the appended claims.

What is claimed is:

1. A method of producing a total water circulating flow in a shallow water area, comprising the steps of:
   jetting water under pressure to produce a forced water flow that rises from a bottom portion toward a top portion of the shallow area through a vertical tubular passage;
   causing the forced water flow produced to act upon water in the tubular passage so that the water rises with increasing speed through the tubular passage from the bottom end thereof toward the top end thereof; and
   forcing the water in the tubular passage to be jetted out from the top end of the tubular passage and to be diffused in radial directions, so as to create a circulating motion.

2. The method as defined in claim 1, wherein the step of jetting water under pressure a forced water flow includes delivering water under pressure from a nozzle.

3. The method as defined in claim 1, wherein
   in said step of forcing water to be jetted from the top end of the tubular passage, the water is jetted from said tubular passage such that a swell is created on a surface of the water in the shallow water area directly above the tubular passage.

4. An apparatus for producing a total water circulating flow in a shallow water area, comprising:
   a vertically disposed tubular assembly having a vertical tubular passage defined therein, said tubular assembly being adapted to be disposed in the shallow water area for allowing water to flow upwardly through said tubular passage from a bottom end thereof toward a top end thereof; and
   nozzle means disposed inside the tubular passage and exposed to the water in the tubular passage for jetting water under pressure into water present in said tubular passage to act upon the water in said tubular passage, to cause the water to rise with increasing speed.

5. The apparatus as defined in claim 3, wherein said nozzle means extends through the lower peripheral wall of the tubular passage and is exposed to the water in the tubular passage at the center of the tubular passage.

6. The apparatus as defined in claim 3, wherein said nozzle means is provided around the lower peripheral wall portion of the tubular passage and is exposed to the water in the tubular passage at the inner wall of the tubular passage.

7. The apparatus as defined in claim 4, further comprising a fluid pump placed on land and a connecting hose connected between said fluid pump and said nozzle means.

8. The apparatus as defined in claim 4, further comprising a fluid pump placed under water and a connecting hose connected between said fluid pump and said nozzle means.

9. The apparatus as defined in claim 5, further comprising
 a hose having a first end adapted to connect to a pressurized fluid supply and a second end; and
 wherein said nozzle means comprises a nozzle connected to said second end of said hose.

10. The apparatus as defined in claim 9, wherein said nozzle converges in a direction toward an outlet end thereof from said second end of said hose.

11. The apparatus as defined in claim 6, wherein
 said nozzle means comprises a constricted portion disposed in a lower portion of said tubular passage, a plurality of nozzle apertures being formed in an upper portion of said constricted portion about a periphery thereof.

12. The apparatus as defined in claim 11, further comprising
 a hose having a first end adapted to be connected to a pressurized fluid supply and a second end connected to said nozzle means.

13. The apparatus as defined in claim 4, wherein
 said nozzle means and said tubular assembly together define a means for expelling water from said top end of said tubular passage so as to create a swell in a surface of the water in the shallow water area directly above said tubular passage.

* * * * *